Nov. 12, 1940.    W. NAECKER    2,220,945
COMBINATION AZIMUTH AND BEARING CIRCLE
Filed July 28, 1939    3 Sheets-Sheet 1

INVENTOR
WILLIAM NAECKER
BY
ATTORNEY

Nov. 12, 1940.        W. NAECKER        2,220,945
COMBINATION AZIMUTH AND BEARING CIRCLE
Filed July 28, 1939        3 Sheets-Sheet 2
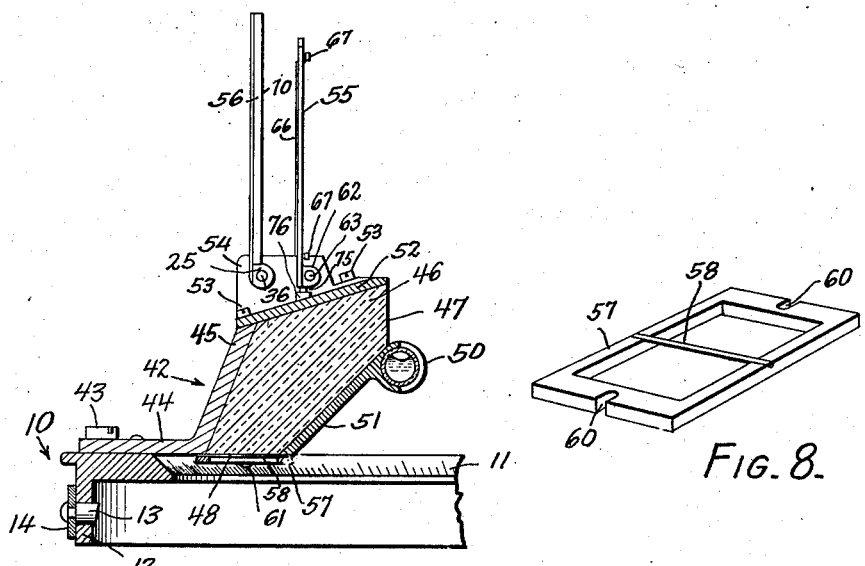
FIG. 3.
FIG. 7.
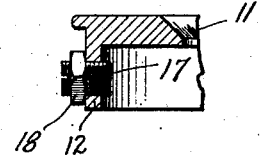
FIG. 4.
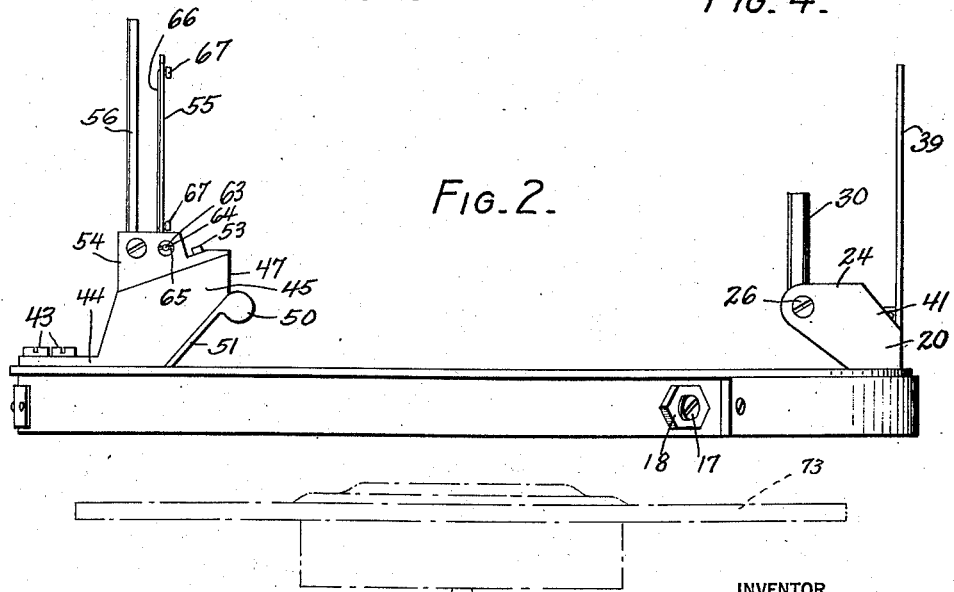
INVENTOR
WILLIAM NAECKER
BY
ATTORNEY Nov. 12, 1940.  W. NAECKER  2,220,945
COMBINATION AZIMUTH AND BEARING CIRCLE
Filed July 28, 1939   3 Sheets-Sheet 3

INVENTOR
WILLIAM NAECKER
BY
ATTORNEY

Patented Nov. 12, 1940

2,220,945

UNITED STATES PATENT OFFICE 2,220,945

COMBINATION AZIMUTH AND BEARING CIRCLE

William Naecker, Suitland, Md.

Application July 28, 1939, Serial No. 287,073

3 Claims. (Cl. 88—2.3)

(Granted under the act of March 3, 1883, as amended April 30, 1928; 370 O. G. 757)

This invention relates to a combination azimuth and bearing circle intended for use with a magnetic compass or pelorus dial to take bearings and azimuths.

A further object of this invention is to provide an azimuth and bearing circle wherein the azimuth units and the bearing units are combined.

A further object of this invention is to provide a new type of circle so constructed that it will reduce the cost of upkeep and repair to a minimum in that it enables the following work to be performed aboard ship:

The azimuth bearing units can be checked and adjusted without the aid of a collimator. Removable pivots and bushings are provided which act as bearings and are arranged so that the various vanes and mirrors can be replaced. Adjustable ring pads are provided to expedite the centering of the bearing ring.

A further object of this invention is to provide means for taking a more accurate azimuth as the black wire center line is reflected on the compass card or pelorus dial, accurately centering the reflected beam of light.

With the foregoing and other objects in view, the invention consists in the construction, combination, and arrangement of parts hereinafter described and illustrated in the drawings, in which Fig. 1 is a top plan view of the azimuth and bearing circle of this invention;

Fig. 2 is an end elevation of Fig. 1 at arrow 2;

Fig. 3 is a sectional view on line 3—3 of Fig. 1;

Fig. 4 is a sectional view on line 4—4 of Fig. 1;

Fig. 7 is an elevational view of the concentric pivot;

Fig. 8 is a perspective view of the prism cross wire frame;

Figure 1:
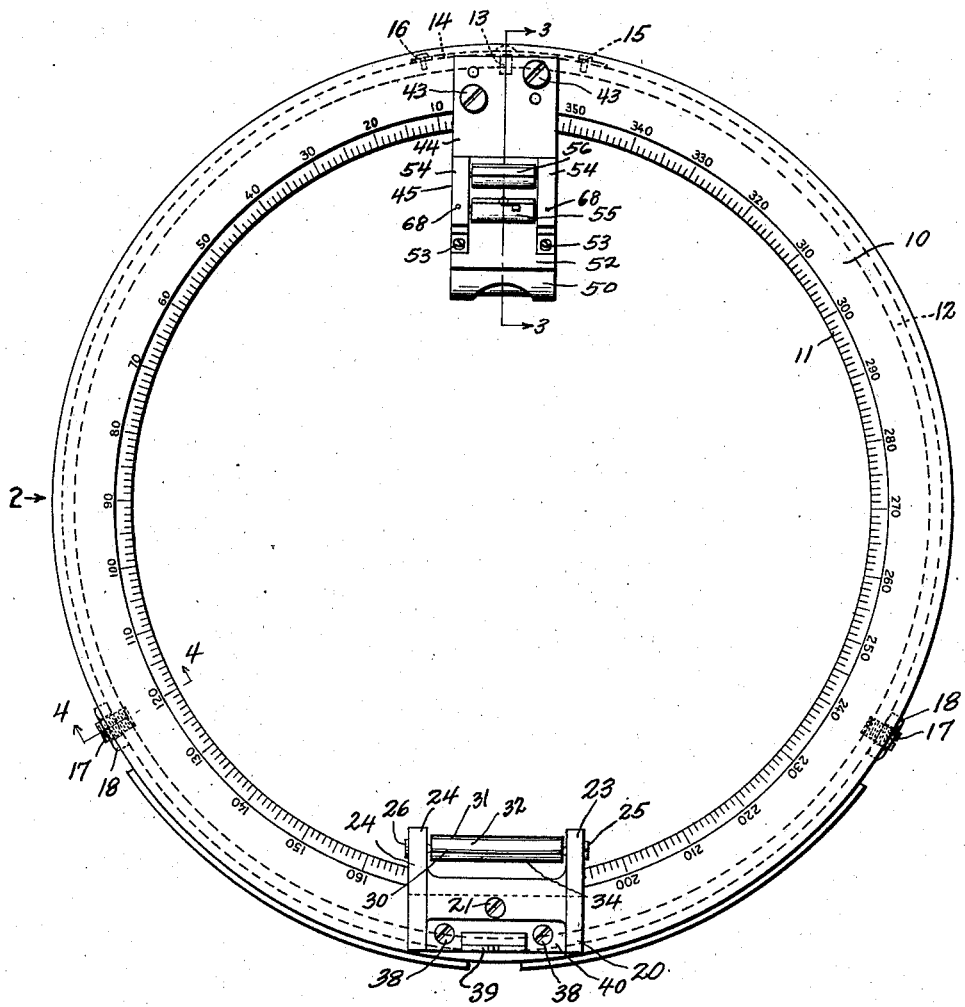

There is shown at 10 the circle having the usual degree markings 11 and provided with the usual downwardly extending flange 12 for locating the circle 10 on the bowl of the compass above the compass card. Extending through the flange 12 is a yieldable pad 13 mounted on a leaf spring 14. The spring 14 is secured to the outside of the flange 12 by means of a screw extending through a hole 15 at one end of the leaf spring 14 and by a second screw extending through an elongated slot 16 in the other end of the leaf spring 14, thereby permitting the spring 14 and the pad 13 to yield outwardly. Equi-distantly spaced from pad 13 about the flange 12 are two adjustable pins 17 threadedly adjustable through the flange 12 and secured in adjusted position by means of lock nuts 18. By properly adjusting the threaded pin 17 the circle 10 can be perfectly centered on the top of the compass bowl.

In this invention the azimuth units and the bearing units are mounted on common supports. A supporting framework 20 is attached to the circle 10 at the 180° position by a screw 21 extending therethrough. This framework 20 is somewhat U-shaped in outline, the bight 22 forming the base through which the screw 21 extends, while upstanding legs 23 and 24 provide supports for the threaded bearing pivots 25 and 26 for the slit mirror 27. The slit mirror 27 consists of a framework 28 having an opaque backing 30 secured thereto as by screws, which likewise extend through an opaque front member 31 provided with a centrally located vertically extending longitudinal slit 32.

Figures 5, 6:
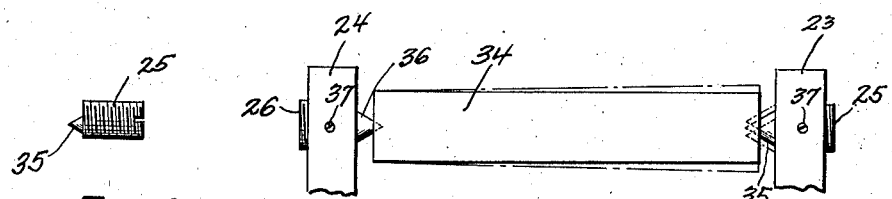
Fig. 5 is an elevational view partly broken away of the means for adjusting the plane of the mirror.
Fig. 6 is an elevational view of the eccentric pivot for adjusting the mirror.
Figure 10:
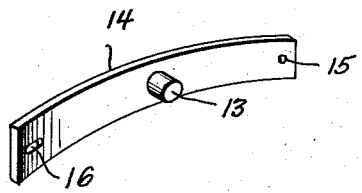
Fig. 10 is a perspective view of the ring pad.
Figure 11:
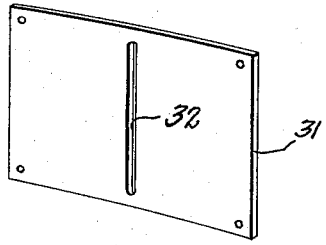
Fig. 11 is an enlarged perspective view of the mirror slit.

Within the frame 28 and between the back 30 and front 31 is a cylindrically curved reflecting mirror 33. The mirror frame 28 is provided with an enlarged cylindrical flange 34 having its ends conically recessed to receive the bearing points 35 and 36 of the threaded bearing pivots 25 and 26. The conical bearing point 35 of bearing pivot 25 is eccentrically located as shown in Figs. 5 and 6, while the bearing point 36 of the bearing pivot 26 is concentrically located, as shown in Figs. 5 and 7. By proper manipulation of these bearing pivots 24 and 25 it is obvious that the plane of a tangent to the cylindrical mirror 33 in framework 28 can be adjusted as brought out in Fig. 5, until it is in a plane exactly parallel to a tangent to the circle 10 at the 180° mark, as desired. When fixed in this proper parallel position locking set screws 37 extending downwardly through the top of the legs 23 and 24 may be tightened against the sides of the pivots 25 and 26 to keep them in adjusted position.

Secured to the bight 22 of the framework 20 by means of screws 38 is a base 40 having upstanding arms 41, between which is pivoted a rear sight 39 provided with its usual sighting slot and peep-holes. Directly across from the position of the supporting framework 20 at the 0—360° position is another framework 42 secured to the circle 10 by means of screws 43 projecting through the extended base 44. The framework 42 includes a prism housing 45 extending upwardly from the base 44 for supporting the prism 46. The prism 46 has a front vertical face 47 and a bottom horizontal face 48. A bubble level 50 is supported directly beneath the vertical prism face 47 by means of a plate 51 extending across the sides of the prism housing 45. A second plate 52 is secured across the top of the prism housing 45 as by screws 53 and is provided with a pair of upstanding legs 54 between which are pivotally mounted the cross wire front sight frame 55 and the black mirror frame 56. Mounted across the lower vertical prism face 48 is a lower plate 57 provided with a cross wire 58 extending centrally thereof, the frame 57 being provided with recessed slots 60 at each end thereof for adjustable cooperation with the securing screws 61 so as to provide for accurate centering of the cross wire 58.

The cross wire front sight frame 55 is pivotally mounted between the upstanding legs 54 by means of a cylindrical frame 62, through which extends a pivoting pin 63. This pivoting pin 63 is journaled at its ends in bushings 64 threadedly secured in each of the legs 54, bushings 64 being provided with screw kerfs 65. By rotating the bushings 64 by means of a screw driver in the kerfs 65 the bushings 64 may be moved transversely of the housing 45 to thus transversely adjust the position of the cross wire frame 55 and its cross wire 66 so that the cross wire 66 is exactly in the 0—360° position, the cross wire 66 being secured on the frame 65 by means of screws 67. After the cross wire 66 has been brought to the exact position desired it may be held in such desired position by means of locking set screws 68 extending downwardly through the tops of the legs 54. The plane of the black mirror 70 on the black mirror frame 56 may be adjusted so as to be exactly parallel to a tangent to the circle 10 at the 0—360° position by means of the same type of adjustable bearing pins 25 and 26 with the eccentric point 35 and a concentric bearing point 36.

The cross wire frame 55 is yieldably held in any position by means of a spring pressed stud 75 mounted on a boss 76 on plate 52 and pressing against the bottom of the cylindrical flange 62.

Figure 9:
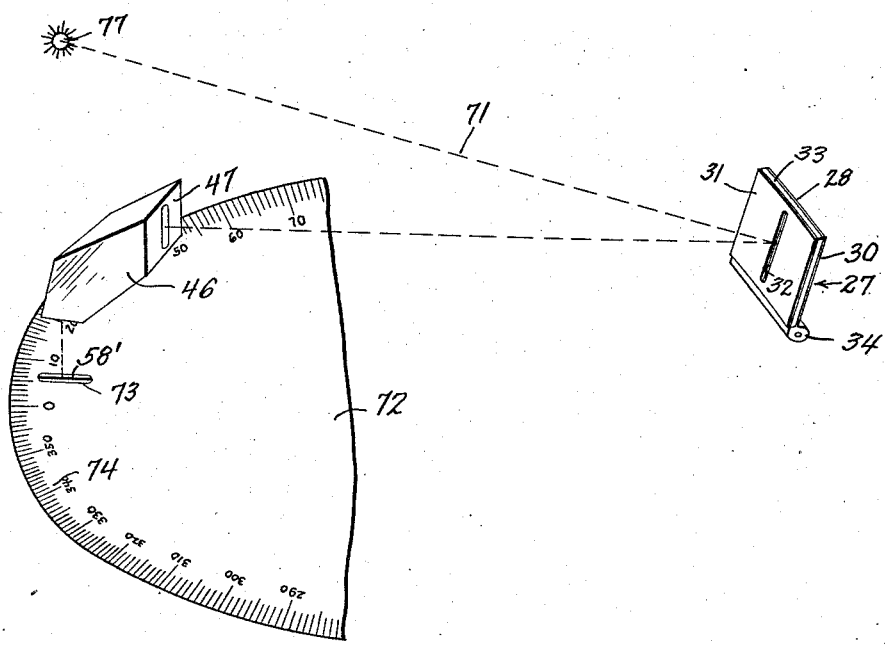
Fig. 9 is a schematic diagram showing the taking of an azimuth.

In operation, an azimuth may be taken in the manner diagrammatically illustrated in Fig. 9 where a ray of light 71 from the sun 77 is reflected through the slit 32 by the mirror 33 through the front face 47 of the prism 46 down onto the compass card 72 at 73. The cross wire 58 splits the reflected beam 73 at 58' when the azimuth is correctly taken, enabling the azimuth to be accurately located on the compass markings 74 of the compass card 72. When, for any reason, the mirror 33 should cease to be parallel to a tangent to the circle at the 180° position, it may be made parallel to the tangent by adjusting the screws 25 and 26 to correct the plane of the mirror. This is done by taking an aximuth of a celestial body, such as the sun, at a time and location when the true azimuth is accurately known, and then adjusting the plane of the mirror 33 until the azimuth taken thereby coincides with the known true azimuth, thus eliminating the necessity for returning the azimuth bearing circle to a shop on shore for making this correction. In the same way, the cross wire 66 may be transversely adjusted by checking it against the known bearing of a terrestrial object. Similarly, the plane of the black mirror 70 may be adjusted against the known azimuth.

Other modifications and changes in the proportions and arrangements of the parts may be made by those skilled in the art without departing from the nature of the invention, within the scope of what is hereinafter claimed.

The invention herein described and claimed may be used and/or manufactured by or for the Government of the United States of America for governmental purposes without the payment of any royalties thereon or therefor.

I claim:

1. In an azimuth bearing circle, an azimuth bearing unit support, a pivotally supported reflecting mirror, and means for adjusting the axis of rotation of said mirror on said support to make said axis of rotation parallel to a tangent to the circle at the point of support.

2. In an azimuth bearing circle, an azimuth bearing unit support, a pivotally supported reflecting mirror, means for adjusting the axis of rotation of said mirror on said support to make said axis of rotation parallel to a tangent to the circle at the point of support, said means comprising a pair of bearing pivots threaded in said support, a concentric bearing point on one of said bearing pivots, and an eccentric bearing point on the other of said bearing pivots.

3. In an azimuth bearing circle, an azimuth bearing support mounted on the circle, a vertical cross wire frame, means for transversely adjusting the position of said vertical cross wire frame on said support, said transversely adjusting means comprising a bearing pivot, a pair of externally threaded bushings, said threaded bushings extending transversely through said support, the ends of said bearing pivots extending into said bushings whereby said bushings may be adjusted in position to thereby adjust said vertical cross wire frame transversely.

WILLIAM NAECKER.